(12) United States Patent
Lee

(10) Patent No.: US 7,716,777 B2
(45) Date of Patent: May 18, 2010

(54) DUSTING ARTICLE STRUCTURE

(75) Inventor: Pei Yuan Lee, Changhua Hsien (TW)

(73) Assignee: Rock Tone Enterprise Co., Ltd., Changhua Hsien (TW)

( * ) Notice: Subject to any disclaimer, the term of this patent is extended or adjusted under 35 U.S.C. 154(b) by 1362 days.

(21) Appl. No.: 11/150,135

(22) Filed: Jun. 13, 2005

(65) Prior Publication Data

US 2006/0130260 A1    Jun. 22, 2006

(30) Foreign Application Priority Data

Dec. 20, 2004    (TW) ............................... 93220650 U

(51) Int. Cl.
*A47L 13/00*    (2006.01)

(52) U.S. Cl. ............... 15/229.3; 15/229.4; 15/229.6; 15/229.7; 15/229.8; 15/229.9; 15/223; 15/226; 15/172

(58) Field of Classification Search ............... 15/229.3, 15/229.4, 229.6, 229.7, 229.8, 229.9, 208, 15/185, 172, 226, 223
See application file for complete search history.

(56) References Cited

U.S. PATENT DOCUMENTS

| | | | | |
|---|---|---|---|---|
| 3,778,860 A | * | 12/1973 | Thielen | ..................... 15/147.2 |
| 4,658,461 A | * | 4/1987 | Roe et al. | ................... 15/210.1 |
| 5,657,507 A | * | 8/1997 | Wasak | ........................ 15/220.1 |
| 5,735,298 A | * | 4/1998 | Mayne et al. | ............... 132/309 |
| 7,293,317 B2 | * | 11/2007 | Tsuchiya et al. | ........... 15/147.2 |
| 2002/0138933 A1 | * | 10/2002 | Slager, Sr. | ................. 15/229.6 |
| 2005/0034260 A1 | * | 2/2005 | Post | .......................... 15/220.1 |
| 2005/0172440 A1 | * | 8/2005 | Lin | ............................. 15/226 |

\* cited by examiner

*Primary Examiner*—Joseph J Hail, III
*Assistant Examiner*—Robert Scruggs
(74) *Attorney, Agent, or Firm*—Senniger Powers LLP

(57) ABSTRACT

Dusting article structure including a duster body and a handle. The duster body includes layers of holding sheets, a fibrous-filament layer, and a cleaning base sheet. A lower layer of the holding sheets and the cleaning base sheet are symmetrically cut to form strip-like cleaning pieces. The filaments of the fibrous-filament layer include numerous tiny pores disposed thereon. The handle includes a grip portion and a connector portion. A coupling block is disposed on the grip portion and includes inserting posts and pivoting grooves to respectively engage with pivoting holes and a pivoting rod of the connector portion thereby. The grip portion is mounted pivotally onto the connector portion having retaining rods to be engaged with holding spaces of the thermo-fusion bonded duster body. The tiny pores disposed at the fibrous-filament layer absorb and trap small grains of dust. The grip portion of the handle may be bent for folding.

16 Claims, 10 Drawing Sheets

DUSTING ARTICLE STRUCTURE

BACKGROUND OF THE INVENTION

The present invention is related to a dusting article structure, comprising a duster body and a handle wherein the duster body is equipped with multiple layers of holding sheets, a fibrous-filament layer, and a cleaning base sheet, and the filaments of the fibrous-filament layer thereof are twisted up with numerous tiny pores disposed thereon that can effectively absorb and trap small grains of dust therein to achieve the best cleaning effect. Besides, the handle is made up of a grip portion pivotally engaged with a connector portion so that, depending on the need of a user, the grip portion of the handle can be conveniently bent and folded up for easy storage and carry, economically saving the space occupied and the cost of package thereof.

Please refer to FIG. 1. A conventional dusting article structure comprises a duster 10 made up of a multiple of handle holding sheets 11, a fibrous filament layer 12, a cleaning base sheet 13, and a handle 14 wherein both opposing edges of the handle holding sheets 11 and the cleaning base sheet 13 thereof are respectively cut into a plurality of plate-like cleaning pieces 111 and strip-like cleaning pieces 131, and the handle 14 has a set of retaining portions 141 symmetrically extending at the front side thereof.

In assembly, the cleaning base sheet 13, the fibrous filament layer 12, and the handle holding sheets 11 are overload from bottom to top as shown in FIG. 2, and bond together via thermo-welding process to form a plurality of joining sections 15 and symmetrical holding spaces 16 disposed at the top layer of the handle holding sheets 11 thereof. The bonded cleaning base sheet 13, the fibrous filament layer 12, and the handle holding sheets are then cut from the centerline thereof and dissevered into a set of left and right duster bodies 17, 18 that are bent downwards to double up, permitting the plural plate-like cleaning pieces 111, fibrous filaments 12, and strip-like cleaning pieces 131 thereof to curve and extend downwards before the retaining portions 141 of the handle 14 are respectively guided and adapted at the holding spaces 16 therein.

There are some drawbacks to such conventional duster 10. First, in the manufacturing thereof, the cleaning base sheet 13, the fibrous filament layer 12, and the handle holding sheets 11 are bond together via thermo-welding process before cut from the centerline and dissevered into left and right duster bodies 17, 18 and then bent downwards to double up, permitting the plural plate-like cleaning pieces 111, fibrous filaments 12, and strip-like cleaning pieces 131 thereof to curve and extend downwards for the registration of the retaining portions 141 of the handle 14 with the holding spaces 16 to provide a cleaning duster for use, which is not only time-consuming, but also uneconomical in the process thereof. Second, the plural fibrous filaments 12 are not provided with any airy pores to absorb and trap tiny grains of dust effectively. Thus, the conventional duster 10 serves poorly in cleaning effect thereof.

Please refer to FIG. 3 showing a second conventional dusting article structure. Another conventional duster 20 comprises a plurality of cleaning sheets 21 that are overlaid one to another and fixedly bond together via thermo-welding process to form a plurality of joining sections 22 and a set of symmetrical holding spaces 23 thereby. Then, the bonded cleaning sheets 21 are doubled up and fusion-bonded once again at predetermined positions of the upper edge thereof to provide fixing sections 24 for secure binding location thereby. Then, the lower edge of the bonded cleaning sheets 21 is processed to provide a plurality of strip-like fibers 25 before retaining portions 261 of a handle 26 are guided and adapted at the holding spaces 23 therein to complete the assembly thereof.

There are some disadvantages to the second conventional dusting article structure. First, in the manufacturing thereof, the duster 20 must be doubly processed via thermo-welding operation so as to securely fix and bind the cleaning sheets 21 thereby, which is not only time-consuming, but also inefficiently uneconomical. Second, the strip-like fibers 25 of the duster 20 are not equipped with any airy pores to effectively trap tiny grains of dust therein, which makes the duster 20 quite limited in cleaning effect.

SUMMARY OF THE PRESENT INVENTION

It is, therefore, the primary purpose of the present invention to provide a dusting article structure, comprising a duster body and a handle wherein the duster body is equipped with multiple layers of holding sheets, a fibrous-filament layer, and a cleaning base sheet that are thermo-fusing bonded only one time before properly bent sideways from both ends to engage with the handle for use, economically saving the time and labor of processing thereof to achieve economical efficiency thereof.

It is, therefore, the second purpose of the present invention to provide a dusting article structure wherein the fibrous-filament layer of the duster body has numerous tiny pores disposed thereon so as to effectively absorb and trap small grains of dust for the best cleaning effect thereof.

It is, therefore, the third purpose of the present invention to provide a dusting article structure wherein the handle is made up of a grip portion pivotally engaged with a connector portion so that, depending on the need of a user, the grip portion of the handle can be conveniently bent and folded up for easy storage and carry, economically saving the space occupied and the cost of package thereof.

DETAILED DESCRIPTION OF THE PREFERRED EMBODIMENTS

Figure 1:
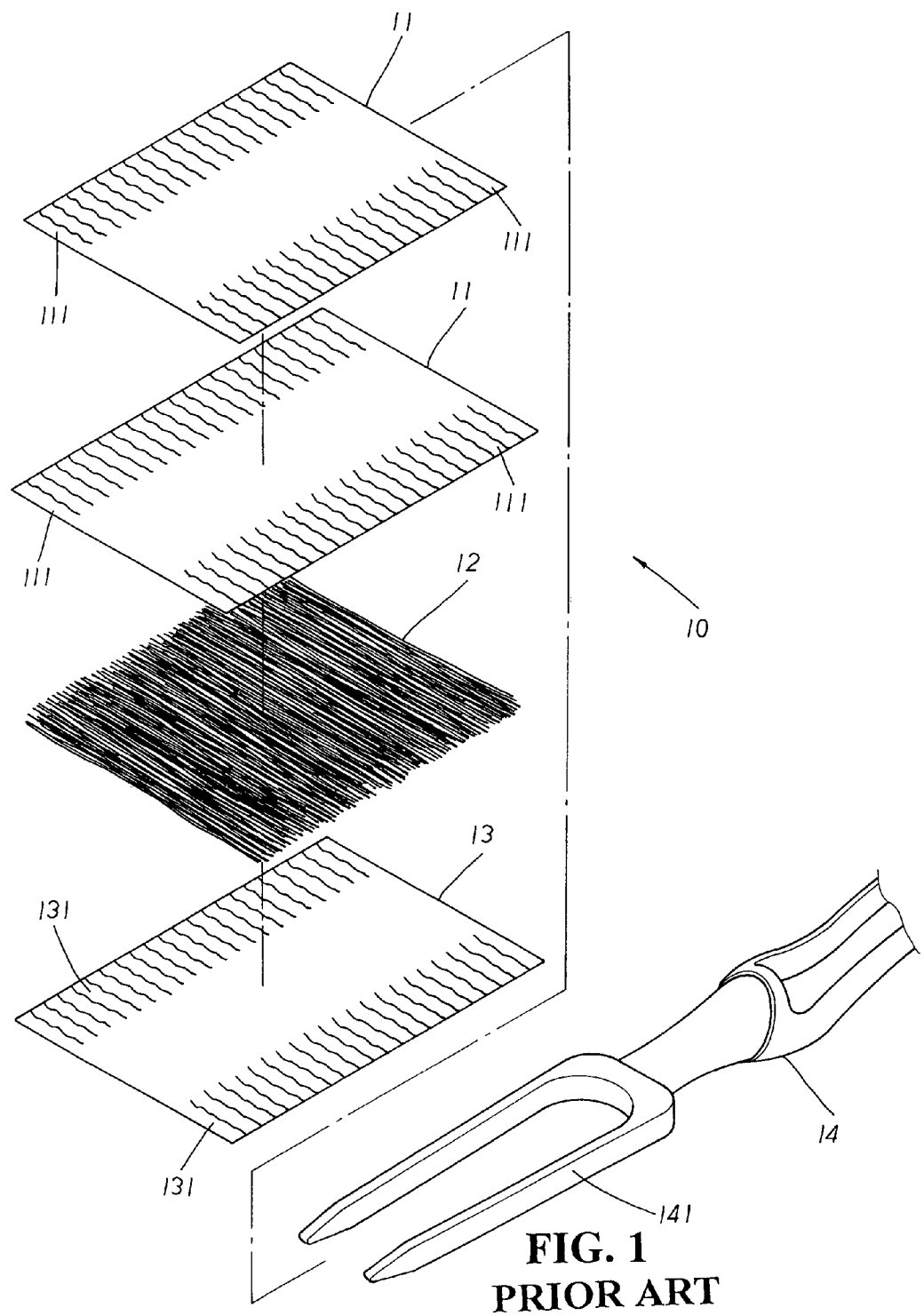
FIG. 1 is a perspective exploded view of a conventional dusting article structure.
Figure 2:
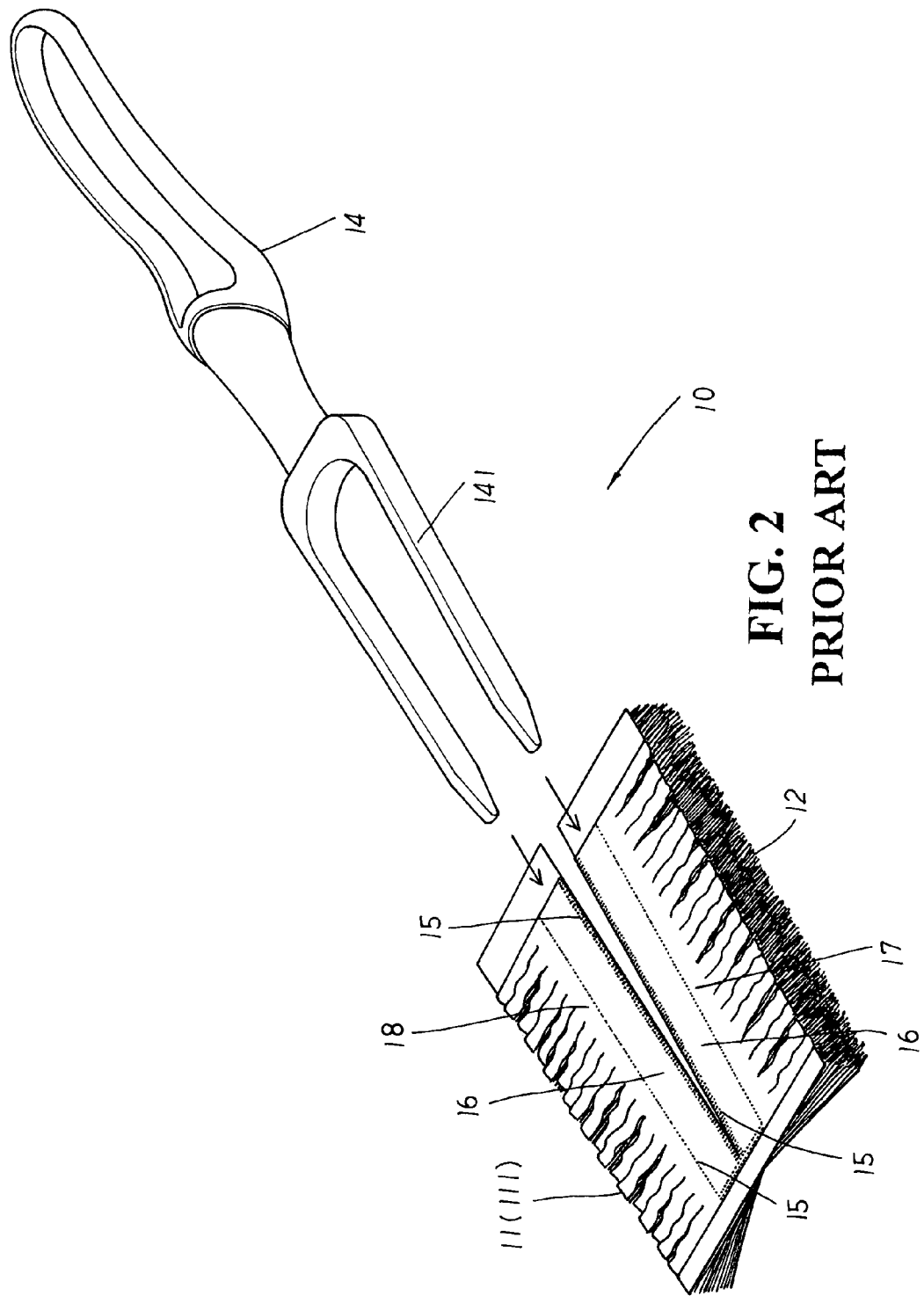
FIG. 2 is a perspective view of the above conventional dusting article in assembly.
Figure 3:
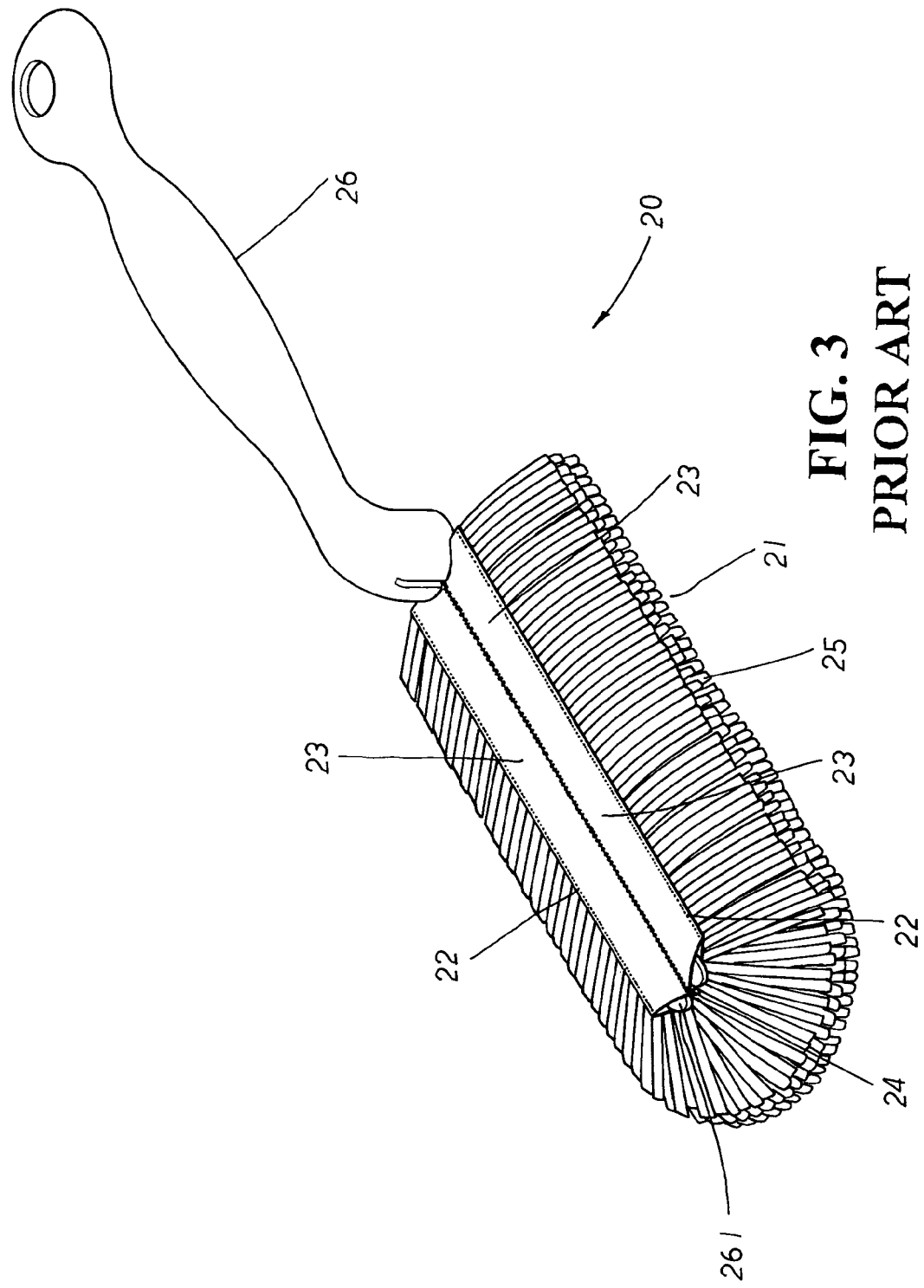
FIG. 3 is a perspective view of another conventional dusting article in assembly.
Figure 4:
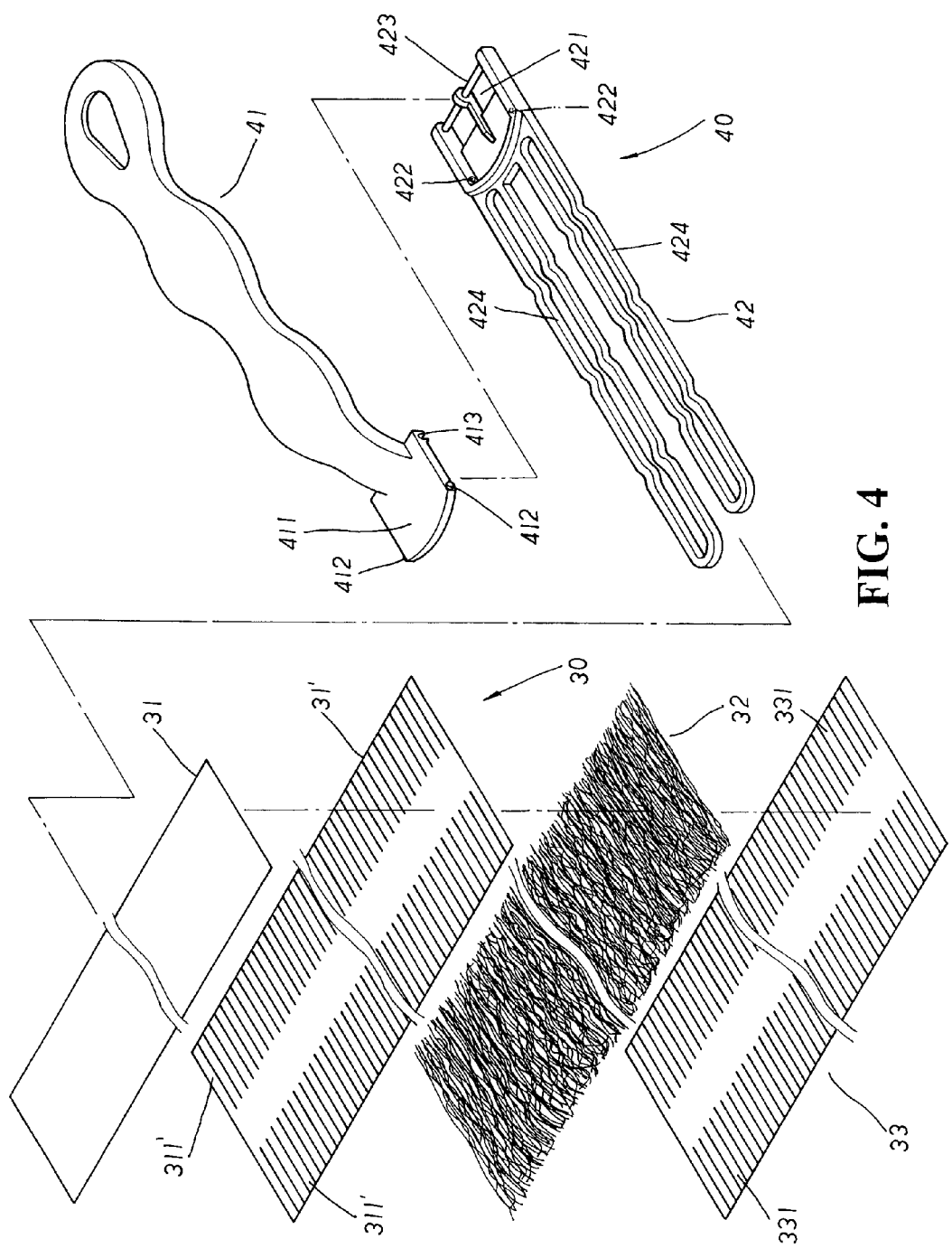
FIG. 4 is a perspective exploded view of the present invention.
Figure 5:
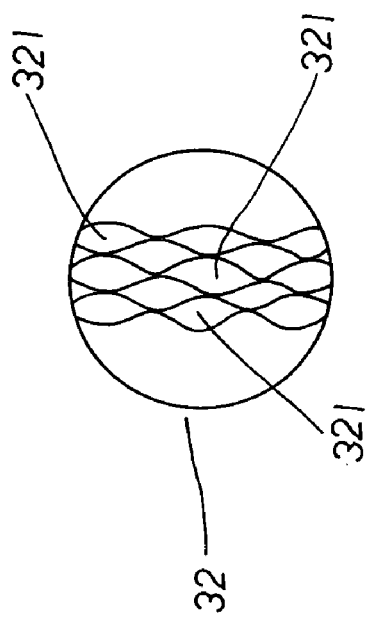
FIG. 5 is a partially enlarged and sectional view of the present invention.

Please refer to FIG. 4 showing an exploded perspective view of the present invention. The present invention is related to a dusting article structure, comprising a duster body 30 and a handle 40 wherein the duster body 30 is equipped with multiple layers of holding sheets 31, 31' (preferably made of non-woven fabric), a layer of multiple fibrous filaments 32 (preferably made of yarns), and a cleaning base sheet 33 (preferably made of non-woven fabric). The lower layer of the holding sheets 31' and the cleaning base sheet 33 are symmetrically cut from both opposing edges for a predetermined length to form a multiple of strip-like cleaning pieces 311', 331 thereon respectively. The fibrous-filament layer 32 thereof is made by a fibrous cloth that, suspending on a hanging axle, is guided via rollers and trimmed via cutters into fiber strips before further processed via a needle-like roller to provide filaments of the fibrous-filament layer 32 that are twisted up with numerous tiny airy pores 321 formed thereon as shown in FIG. 5. The handle 40 is made up of a grip portion 41 and a connector portion 42 wherein the grip portion 41 has a coupling block 411 extending at the front end thereof, and the coupling block 411 is provided with a set of inserting posts 412 symmetrically protruding at predetermined positions thereof, and a set of pivoting grooves 413 symmetrically defining preset positions thereon. The connector portion 42 is equipped with a coupling area 421 having a set of symmetrical pivoting holes 422 disposed at one side and a pivoting rod 423 extending at the other side thereof to respectively match with the inserting posts 412 and the pivoting grooves 413 of the coupling block 411 of the grip portion 41 thereby. The connector portion 42 thereof also includes a set of retaining rods 424 symmetrically extending at the front end thereof.

Figure 6:
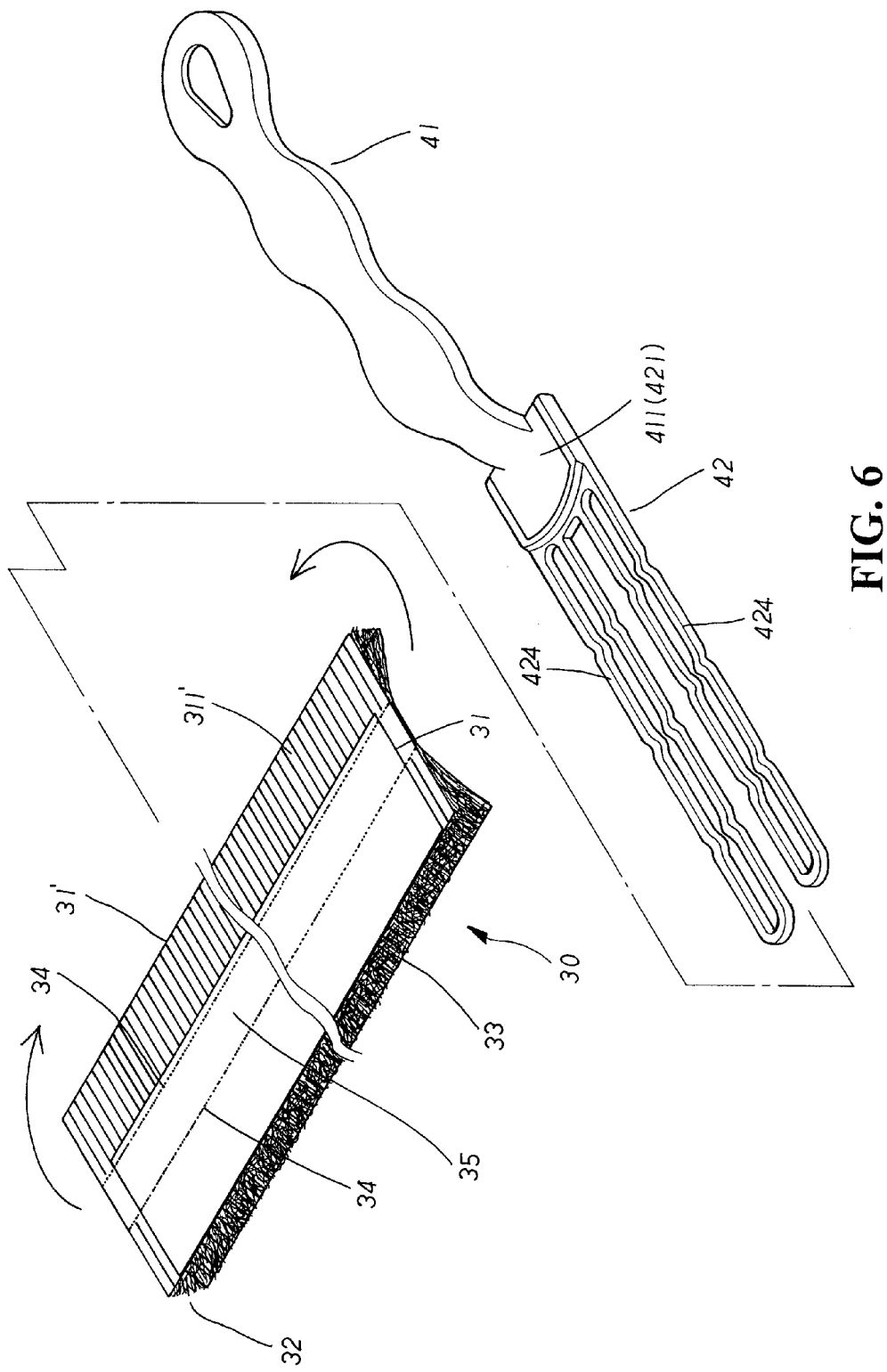
FIG. 6 is a diagram showing the operation of the present invention in assembly.

Please refer to FIG. 6. In assembly, the cleaning base sheet 33, the fibrous-filament layer 32, and the holding sheets 31, 31' of the duster body 30 are overlaid one to another and securely bonded together at predetermined positions via a thermo-welding process to form a plurality of joining sections 34 with an elongated holding space 35 defined therebetween as shown in FIG. 6. The coupling block 411 of the grip portion 41 thereof is then mutually engaged with the coupling area 421 of the connector portion 42 thereof, permitting the inserting posts 412 and the pivoting grooves 413 of the grip portion 41 joined to the matched pivoting holes 422 and the pivoting rod 423 of the connector portion 42 respectively. And, the securely bonded duster body 30 is symmetrically bent sideways from both ends in a proper manner as demonstrated by the arrows in FIG. 6 so as to fold up the elongated holding space 35 into two identical halves of juxtaposed holding spaces 35 thereby. Finally, the retaining rods 424 of the connector portion 42 of the handle 40 are respectively guided to thread and mounted at the juxtaposed holding spaces 35 of the duster body 30 therein to complete the assembly thereof.

Figure 8:
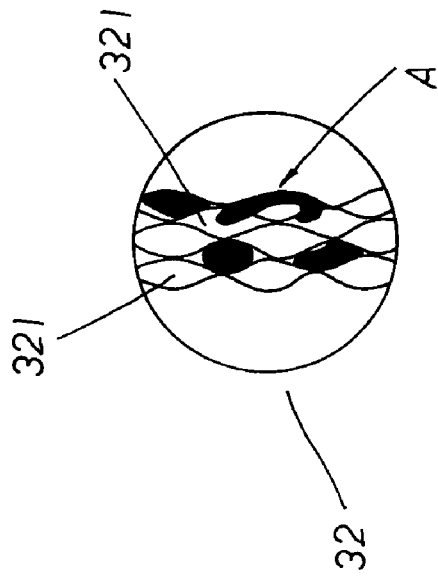
FIG. 8 is a partially enlarged and sectional view of fibrous filaments of the present invention with tiny grains of dust attached and trapped therein.
Figure 7:
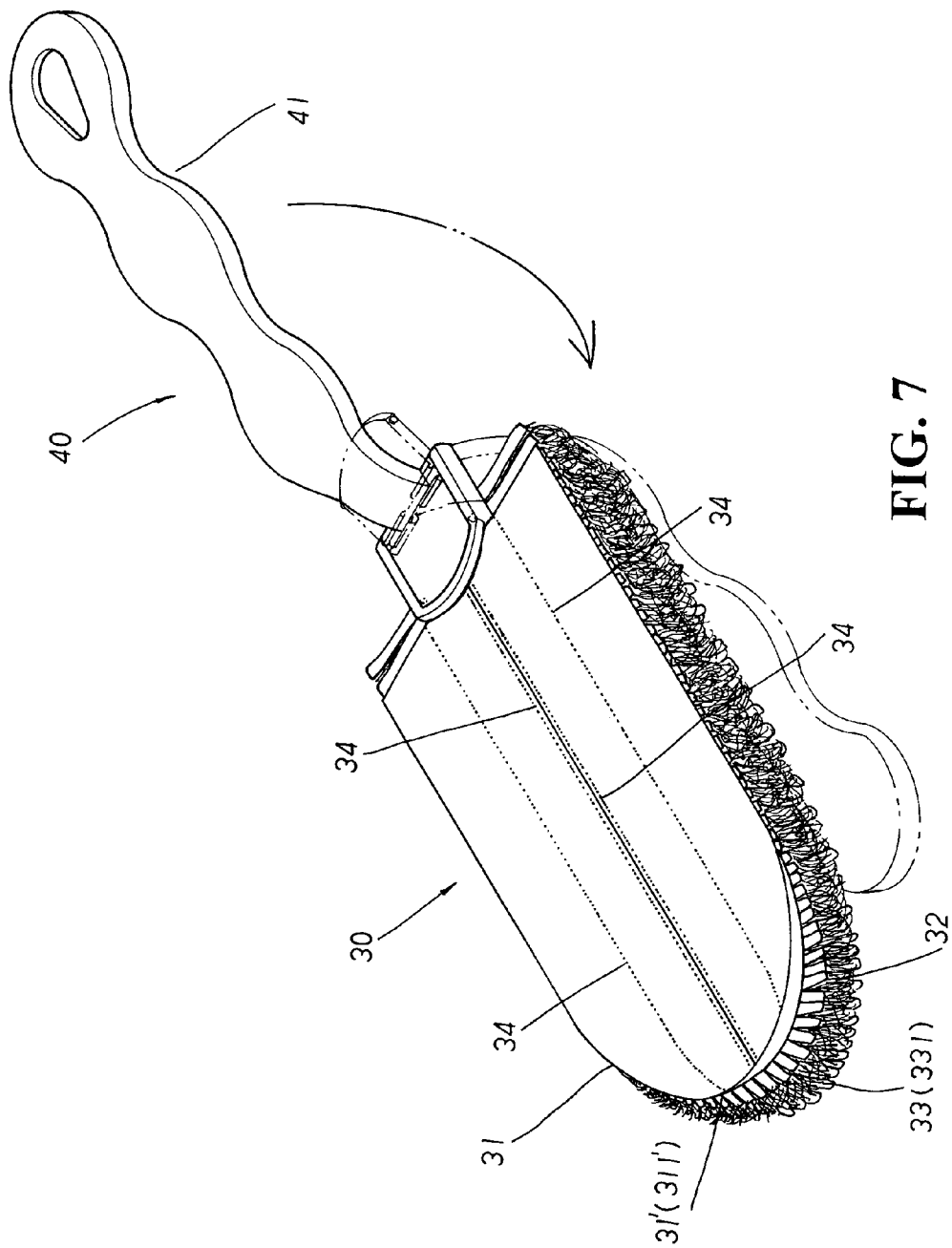
FIG. 7 is a diagram showing the operation of the present invention in practical use.

Please refer to FIG. 7 showing the operation of the present invention in practical use. Via the strip-like cleaning pieces 311', 331 of the holding sheets 31' and the cleaning base sheet 33 thereof, the duster body 30 can efficiently remove dust from the surfaces of a wide range of articles. Besides, the numerous tiny pores 321 disposed at the fiber-filament layer 32 of the duster body 30 thereon can also effectively absorb and trap small grains of dust A as shown in FIG. 8 to achieve the best cleaning effect thereby. And, depending on the need of a user, the grip portion 41 of the handle 40 can also be conveniently bent downwards to fold it up for easy storage and carry, economically saving the space occupied and the cost of package thereof.

Figure 9:
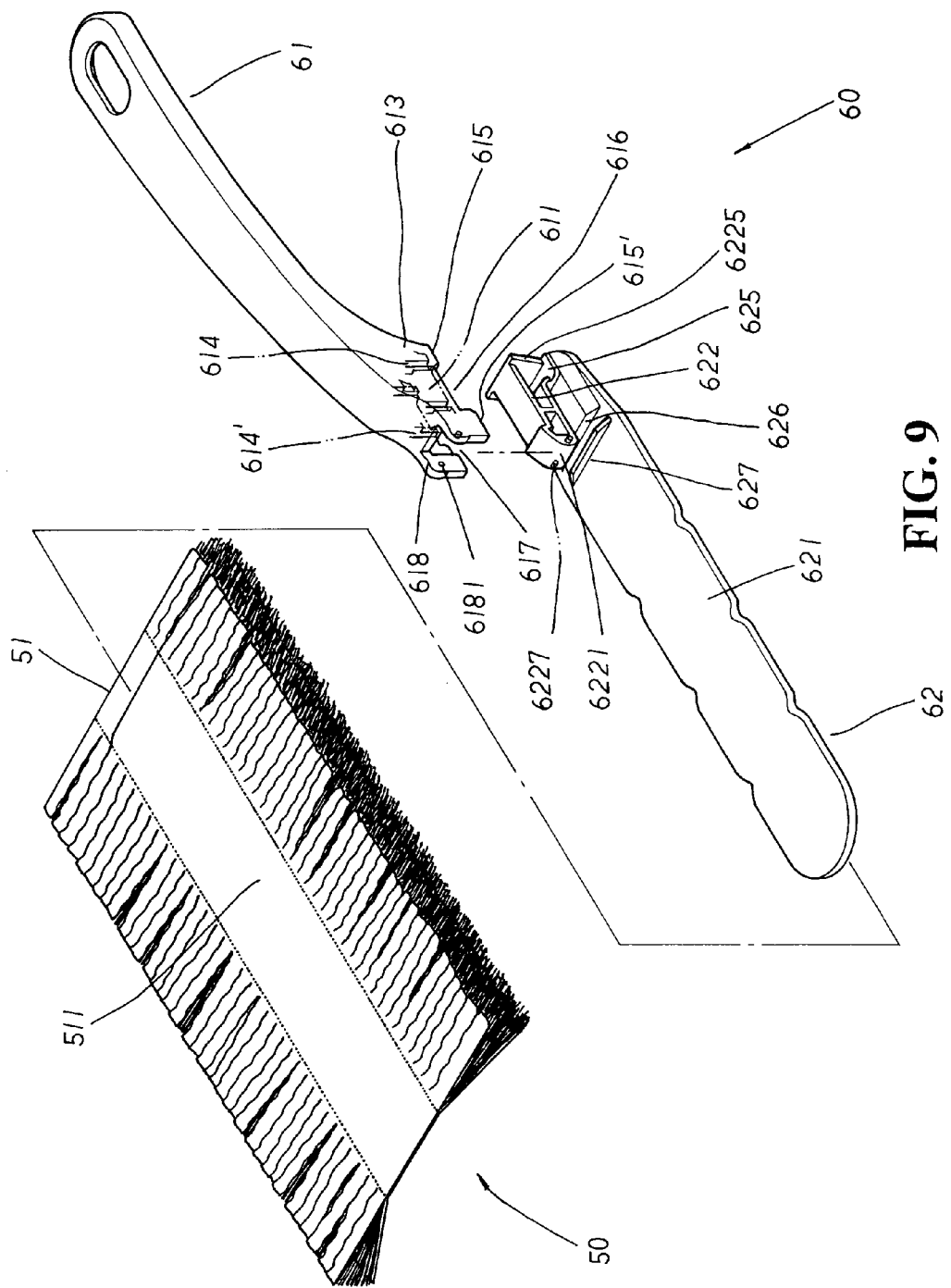
FIG. 9 is a perspective exploded view of another embodiment of the present invention.
Figure 10:
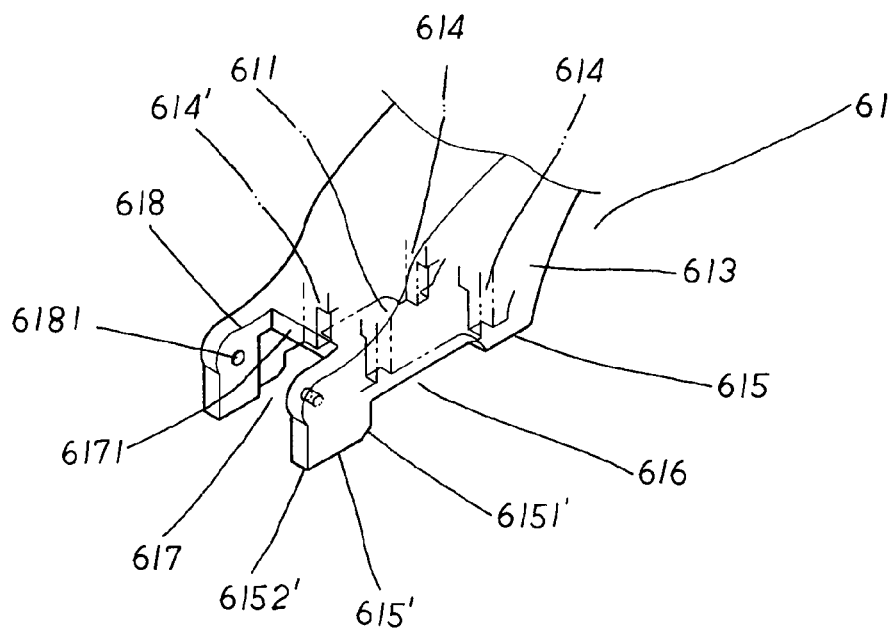
FIG. 10 is a partially enlarged and perspective view of the second embodiment of the present invention.
Figure 11:
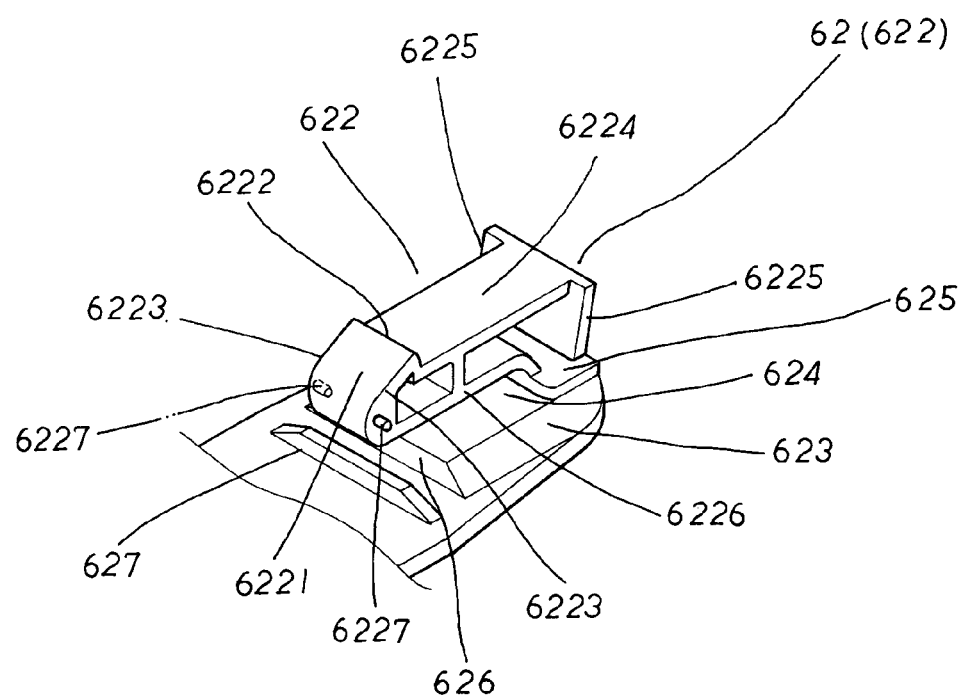
FIG. 11 is another partially enlarged and perspective view of the second embodiment of the present invention.

Please refer to FIGS. 9 to 11 inclusive showing another embodiment of the present invention. The present invention can also include a duster body 50 and a handle 60 wherein the duster body 50 is provided with a holding sheet 50 to form an elongated holding space 511 in the middle section thereof, and the handle is made up of a grip portion 61 and a connector portion 62. The grip portion 61 is equipped with a receiving cavity 611 indented at the bottom side of the front end thereof with compressing sections 612 symmetrically protruding therein (referring to FIG. 12), curved conjoining faces 613 formed at both sides thereof, and rear and front locating posts 614, 614' symmetrically disposed at preset positions therein. At the bottom surface of the grip portion 61 thereof is also disposed sets of symmetrical rear and front abutting sides 615, 615' to define a recessed receiving space 616 therebetween. One edge of the front abutting side 615' is cut with an oblique abutting slope 6151', while the other edge thereof forms an abutting flange 6152'. A pivoting groove 617 with a stop facet 6171 defined at one edge thereon is properly set at the front end of the grip portion 61 thereof, and a set of abutting plates 618 with pivoting holes 6181 disposed thereon extends symmetrically at both sides of the pivoting groove 617 thereof. The connector portion 62 is equipped with a retaining rod 621, and a coupling area 622 extending at the rear upper side of the retaining rod 621 thereof. The coupling area 622 has a pivoting block 6221 protruding at the upper section of one side to match with the pivoting groove 617 of the grip portion 61 thereby, an abutting facet 6222 defining one edge of the pivoting block 6221, and a set of connecting sections 6223 defining both lateral sides of the pivoting block 6221 to engage with the abutting plates 618 of the grip portion 61 thereby. At the other side of the coupling area 622 is disposed a T-shaped compressed surface 6224 that, having lateral engaging sides 6225 extending at both edges thereof, is matched with the compressing sections 612 of the grip portion 61 thereby. Under the compressed surface 6224 thereof is symmetrically disposed a set of abutted sections 6226, and at both lateral sides of the pivoting block 6221 is properly disposed a set of symmetrical pivoting posts 6227. The coupling area 622 thereof is fixed on top of a protrusive seat 623 to define a retaining space 624 there-between wherein the protrusive seat 623 has a locating surface 625 protruding upwards at one side thereon, and an oblique limiting facet 626 defining the other side thereof. And a support block 627 is properly disposed in front of the protrusive seat 623 thereof.

Figure 12:
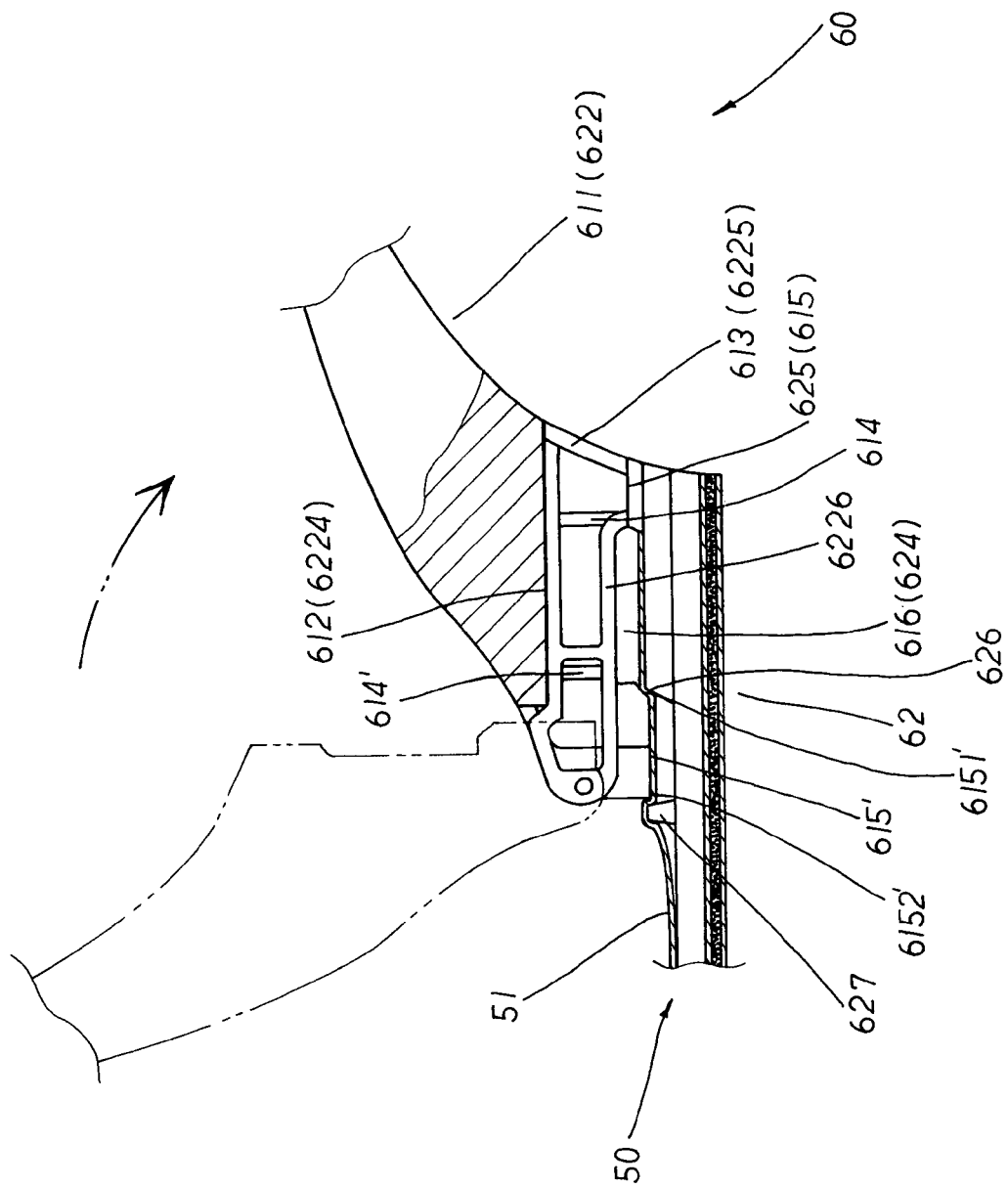
FIG. 12 is a cross-sectional view showing the second embodiment of present invention in assembly and operation thereof.

Please refer to FIG. 12. In assembly, the coupling area 622 of the connector portion 62 thereof is adapted into the receiving groove 611 of the grip portion 61 thereof, permitting the pivoting block 6221 and the pivoting posts 6227 thereof to respectively engage with the pivoting groove 617 of the grip portion 61 and the pivoting holes 6181 of the abutting plates 618 thereof, and the abutting facet 6222 and the connecting sections 6223 thereof to respectively abut against the stop facet 6171 and the matched abutting plates 618 of the pivoting groove 617 so as to engage the connector portion 62 precisely with the grip portion 61 thereby. Meanwhile, the locating posts 614, 614' of the grip portion 61 are respectively guided and abutted against the abutted sections 6226 at predetermined positions thereof, and the compressing section 612 and the rear abutting sides 615 of the grip portion 61 are precisely pressed onto the compressed surface 6224 of the coupling area 622 and the locating surface 625 of the protrusive seat 623 for stable and limiting location thereby. And the engaging sides 6225 of the coupling area 622 thereof are joined to the matched conjoining faces 613 of the grip portion 61 and properly engaged therewith. Then, the grip portion 61 of the handle 60 is bent to one side to form a proper angle with the connector portion 62, and the retaining rod 621 of the connector portion 62 is guided into the holding space 511 of the holding sheet 51 disposed at the upper layer of the duster body 50 till located at a predetermined position, permitting one side of the holding sheet 51 to accommodate at the recessed receiving space 616 of the grip portion 61 and the retaining space 624 of the connector portion 62 therein. The grip portion 61 is then bent to recover the former engaged position thereof, permitting the oblique abutting slopes 6151' and the abutting flanges 6152' of the front abutting sides 615' thereof to respectively abut against the matched oblique limiting facet 626 of the protrusive seat 623 and the support block 627 thereof so as to clamp tight the holding sheet 51 adapted therein. Therefore, with the holding sheet 51 securely clamped tight and located by the handle 60 thereof, the duster body 50 can exert the best use for cleaning purposes. In addition, according to the need of a user, the grip portion 61 of the handle 60 can also be bent to one side to fold it up for easy storage and carry with the minimum space occupied.

What is claimed is:

1. A dusting article structure, comprising:
a duster body comprising multiple layers of holding sheets, a fibrous-filament layer, and a cleaning base sheet; and
a handle comprising a grip portion pivotally engaged with a connector portion to provide a movable handle the grip portion of the handle being bendable downwardly to fold the handle for storage and carriage, wherein the grip portion of the handle comprising:
 a receiving cavity having compressing sections symmetrically disposed at predetermined positions at a bottom side of a front end of the grip portion,
 conjoining faces extending at both sides of the grip portion,
 rear and front locating posts symmetrically protruding at preset positions thereon,
 a set of symmetrical rear abutting and front abutting sides on a bottom surface of the grip portion to define a recessed receiving space therebetween, wherein the front abutting side has an abutting slope cut at one edge and an abutting flange disposed at another edge thereof,
 a pivoting groove with a stop facet disposed at one edge thereon, said pivoting groove being set at the front end of the grip portion, and
 a set of abutting plates with pivoting holes disposed therein for extending symmetrically at both lateral sides of the pivoting groove.

2. The dusting article structure according to claim 1 wherein the grip portion of the handle has a coupling block extending at the front end, and the coupling block is provided with a set of inserting posts symmetrically protruding at predetermined positions and a set of symmetrical pivoting grooves defining preset positions thereon.

3. The dusting article structure according to claim 1 wherein the connector portion of the handle comprises a coupling area having symmetrical pivoting holes disposed at one side thereof and a pivoting rod extending at the other side thereof, and a set of retaining rods symmetrically protruding at the front end thereof.

4. The dusting article structure according to claim 1 wherein the connector portion of the handle further comprises:
a retaining rod, and
a coupling area extending at a rear upper side of the retaining rod, the coupling area having a pivoting block protruding at an upper section of one side of the coupling area, said coupling area having an abutting facet defining one edge of the pivoting block, and a set of connecting sections defining both lateral sides of the pivoting block thereof,
wherein at another side of the connecting area is disposed a compressed surface with lateral engaging sides extending at both edges thereof, a set of abutted sections being symmetrically disposed under the compressed surface of the connecting area, and a set of pivoting posts being symmetrically disposed at both lateral sides of the pivoting block, wherein the coupling area is fixed on top of a protrusive seat to define a retaining space therebetween, wherein the protrusive seat has a locating surface protruding upwards at one side thereon, said protrusive seat having a limiting facet defining another side thereof and a support block being properly disposed in front of the protrusive seat thereof.

5. The dusting article structure according to claim 4 wherein the compressed surface of the coupling area thereof is made in a T-like shape.

6. The dusting article structure according to claim 4 wherein the limiting facet of the coupling area is made in an oblique shape.

7. The dusting article structure according to claim 1 wherein the conjoining faces of the grip portion thereof are shaped in curved forms.

8. The dusting article structure according to claim 1 wherein the abutting slopes defining one edge of the front abutting sides of the grip portion are shaped in oblique forms.

9. A dusting article structure, comprising:
a duster body having multiple layers of holding sheets, a fibrous-filament layer, and a cleaning base sheet; and
a handle having a grip portion pivotally engaged with a connector portion to provide a movable handle, said grip portion of the handle being bendable downwardly to fold the handle for storage and carriage, wherein the connector portion of the handle further comprises:
a retaining rod, and
a coupling area extending at a rear upper side of the retaining rod, the coupling area having a pivoting block protruding at an upper section of one side of the coupling area, said coupling area having an abutting facet defining one edge of the pivoting block, and a set of connecting sections defining both lateral sides of the pivoting block thereof,
wherein at another side of the connecting area is disposed a compressed surface with lateral engaging sides extending at both edges thereof, a set of abutted sections being symmetrically disposed under the compressed surface of the connecting area, and a set of pivoting posts being symmetrically disposed at both lateral sides of the pivoting block, wherein the coupling area is fixed on top of a protrusive seat to define a retaining space therebetween, wherein the protrusive seat has a locating surface protruding upwards at one side thereon, said protrusive seat having a limiting facet defining another side thereof, and a support block being properly disposed in front of the protrusive seat thereof.

10. The dusting article structure according to claim 9 wherein the grip portion of the handle has a coupling block extending at a front end thereof, and the coupling block is provided with a set of inserting posts symmetrically protruding at predetermined positions and a set of symmetrical pivoting grooves defining preset positions thereon.

11. The dusting article structure according to claim 9 wherein the coupling area of the connector portion of the handle comprises symmetrical pivoting holes disposed at one side thereof and a pivoting rod extending at the other side thereof, and a set of retaining rods symmetrically protruding at a front end thereof.

12. The dusting article structure according to claim 9 wherein the grip portion of the handle further comprises:
   a receiving cavity having compressing sections symmetrically disposed at predetermined positions at a bottom side of a front end of the grip portion,
   conjoining faces extending at both sides of the grip portion,
   rear and front locating posts symmetrically protruding at preset positions thereon,
   a set of symmetrical rear abutting and front abutting sides on a bottom surface of the grip portion to define a recessed receiving space therebetween, wherein the front abutting side has an abutting slope cut at one edge and an abutting flange disposed at another edge thereof,
   a pivoting groove with a stop facet disposed at one edge thereon, said pivoting groove being set at the front end of the grip portion, and
   a set of abutting plates with pivoting holes disposed therein for extending symmetrically at both lateral sides of the pivoting groove.

13. The dusting article structure according to claim 12 wherein the conjoining faces of the grip portion thereof are shaped in curved forms.

14. The dusting article structure according to claim 12 wherein the abutting slopes defining one edge of the front abutting sides of the grip portion are shaped in oblique forms.

15. The dusting article structure according to claim 9 wherein the compressed surface of the coupling area thereof is made in a T-like shape.

16. The dusting article structure according to claim 9 wherein the limiting facet of the coupling area is made in an oblique shape.

* * * * *